United States Patent
Curtis (10) Patent No.: US 11,149,828 B2
(45) Date of Patent: Oct. 19, 2021

(54) BALL SCREW WITH SECONDARY LEAD FOR FAILURE DETECTION

(71) Applicant: Eaton Intelligent Power Limited, Dublin (IE)

(72) Inventor: Tyler Q. Curtis, Rockford, MI (US)

(73) Assignee: Eaton Intelligent Power Limited, Dublin (IE)

( * ) Notice: Subject to any disclaimer, the term of this patent is extended or adjusted under 35 U.S.C. 154(b) by 104 days.

(21) Appl. No.: 16/070,362

(22) PCT Filed: Jan. 20, 2017

(86) PCT No.: PCT/IB2017/050310
§ 371 (c)(1),
(2) Date: Jul. 16, 2018

(87) PCT Pub. No.: WO2017/125890
PCT Pub. Date: Jul. 27, 2017

(65) Prior Publication Data
US 2019/0017580 A1    Jan. 17, 2019

Related U.S. Application Data (60) Provisional application No. 62/280,857, filed on Jan. 20, 2016.

(51) Int. Cl.
*F16H 25/20*    (2006.01)
*F16H 25/22*    (2006.01)
(Continued)

(52) U.S. Cl.
CPC ............ *F16H 25/205* (2013.01); *B64C 13/28* (2013.01); *B64C 13/341* (2018.01);
(Continued)

(58) Field of Classification Search
CPC .............. F16H 25/205; F16H 25/2204; F16H 25/2409; F16H 25/2003; F16H 25/2009;
(Continued)

(56) References Cited

U.S. PATENT DOCUMENTS 2,855,790 A * 10/1958 Smith ................. F16H 25/2472
74/424.75
3,581,592 A * 6/1971 Roehrs ................ F16H 25/2204
74/424.6
(Continued)

FOREIGN PATENT DOCUMENTS

| EP | 1283384 A2 | 2/2003 | |
|----|---|---|---|
| FR | 2970464 A1 | 7/2012 | |
| JP | 2002227957 A * | 8/2002 | ............... B30B 1/18 |

OTHER PUBLICATIONS

Mraz, Stephen. "A Critical Look at Acme, Ball, and Roller Screws for Linear Motion." May 6, 2009. MachineDesign. Document. Feb. 26, 2020. <https://www.machinedesign.com/print/content/21834584>. (Year: 2009).*

(Continued)

*Primary Examiner* — Joseph Brown
(74) *Attorney, Agent, or Firm* — Fishman Stewart PLLC (57) ABSTRACT

A ball screw assembly for use in an actuator is provided. The ball to screw assembly may include a ball screw supported for rotation by the actuator. A ball nut may be provided around the ball screw and may be held against rotation with the ball screw by said actuator. A primary load path may be provided between the ball screw and the ball nut for operatively coupling the ball nut with the ball screw. A secondary load path may be provided between the ball screw and the ball nut, wherein the secondary load path can be disengaged during a normal operating mode of the ball screw assembly (Continued)

and the secondary load path can be engaged during a second operating mode of the ball screw assembly.

9 Claims, 6 Drawing Sheets

(51) Int. Cl.
  *F16H 25/24* (2006.01)
  *B64C 13/28* (2006.01)
(52) U.S. Cl.
  CPC ..... *F16H 25/2204* (2013.01); *F16H 25/2209* (2013.01); *F16H 25/2472* (2013.01)
(58) Field of Classification Search
  CPC ... F16H 25/2472; B64C 13/28; B64C 13/341; B64C 13/504
  USPC ....................................................... 74/89.26
  See application file for complete search history.

(56) References Cited

U.S. PATENT DOCUMENTS

| | | | | |
|---|---|---|---|---|
| 6,685,382 | B2* | 2/2004 | Capewell | F16H 25/2204 403/343 |
| 8,291,782 | B1* | 10/2012 | Shaheen | F16H 25/2472 74/89.26 |
| 8,496,204 | B1* | 7/2013 | Charafeddine | F16H 25/2003 244/99.4 |
| 2002/0104394 | A1* | 8/2002 | Manzanares | F16H 25/2472 74/89.26 |
| 2003/0029258 | A1* | 2/2003 | Davies | B64C 9/02 74/89.26 |
| 2004/0200929 | A1* | 10/2004 | Perni | F16H 25/205 244/99.11 |
| 2005/0016305 | A1* | 1/2005 | Lardy | F16H 25/2472 74/89.42 |
| 2005/0132831 | A1* | 6/2005 | Scholz | F16H 25/2472 74/89.26 |
| 2007/0193381 | A1* | 8/2007 | Rodrigues | F16H 25/205 74/89.26 |
| 2011/0048147 | A1 | 3/2011 | Keech et al. | |
| 2014/0190291 | A1* | 7/2014 | Medina | F16H 25/205 74/89.23 |
| 2016/0281826 | A1* | 9/2016 | Medina | F16H 25/2204 |
| 2018/0045291 | A1* | 2/2018 | Teyssier | F16D 9/06 |
| 2019/0368585 | A1* | 12/2019 | Burgess | F16H 25/2454 |

OTHER PUBLICATIONS

JP 2002227957 A (Katsunori Haseba) Aug. 14, 2002. [online] [retrieved on Jun. 17, 2020], Retrieved from: Proquest Dialog. (Year: 2002).*

International Search Report, PCT/IB2017/050310, filed Apr. 28, 2017.

* cited by examiner

BALL SCREW WITH SECONDARY LEAD FOR FAILURE DETECTION

CROSS-REFERENCE TO RELATED APPLICATIONS

This application is a National Stage Patent Application of International Patent Application No. PCT/IB2017/050310, filed Jan. 20, 2017, which claims the benefit of U.S. Provisional Application Ser. No. 62/280,857, filed Jan. 20, 2016, the contents of both are incorporated by reference in their entireties.

TECHNICAL FIELD

The present disclosure relates generally to actuation systems and actuators, including actuators having ball screw assemblies for use in connection with aircraft.

BACKGROUND

Modern aircraft include actuation systems. Such systems may include, among other things, components that are pivotally supported relative to portions of the airplane that are subject to adjustment by an operator or pilot. For instance, trimmable horizontal stabilizer actuators commonly consists of a ball nut assembly. A ball nut assembly may have a ball nut and a rotatable ball screw extending axially through the ball nut. At least one ball bearing may be disposed within a helical ball groove that is formed between the ball nut and the ball screw. As such, when the ball screw is rotated relative to the ball nut, the ball nut may move in a linear motion along a length of the ball screw. Rotation of the ball screw is commonly accomplished by a motor and gear box.

However, conventional ball screw assemblies do not allow for inspection or non-invasive detection of wear on the internal components of a ball screw assembly without disassembly of the actuator. Thus, although current ball screw assemblies generally function in a suitable manner, it may be desirable to provide a ball screw assembly that can detect and monitor wear on internal components of the ball screw assembly.

SUMMARY

A ball screw assembly for use in an actuator is provided. In an embodiment, the ball screw assembly may include a ball screw supported for rotation by the actuator. A ball nut may be provided around the ball screw and held against rotation with the ball screw by said actuator. A primary load path may be provided between the ball screw and the ball nut for operatively coupling the ball nut with the ball screw. A secondary load path may be provided between the ball screw and the ball nut, wherein the secondary load path can be disengaged during a normal operating mode of the ball screw assembly and the secondary load path can be engaged during a second operating mode of the ball screw assembly.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
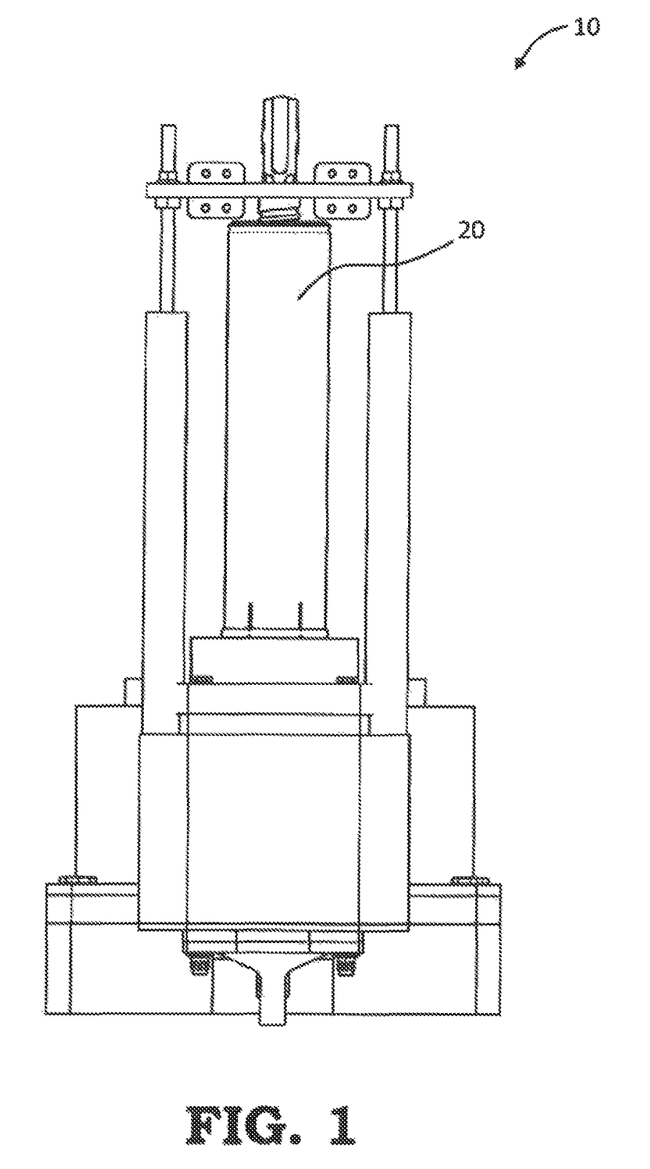
FIG. 1 is a plan view of an actuation system according to an embodiment of the present disclosure.
Figure 2:
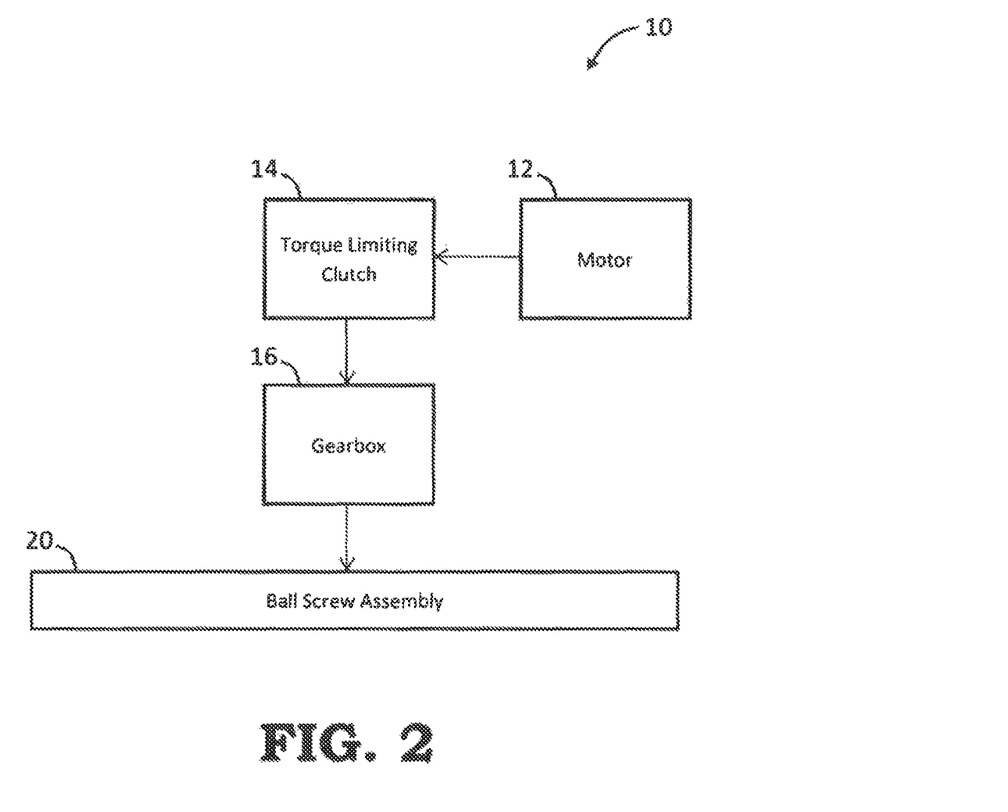
FIG. 2 is a diagram of the actuation system generally shown in FIG. 1.

Referring now to FIGS. 1 and 2, an actuation system according to an embodiment of the present disclosure is shown, indicated generally at 10. The actuation system 10 can be used, for example, to actuate and control components on an aircraft that are subject to adjustment by an operator or pilot. For example and without limitation, the actuation system 10 may be configured to adjust horizontal stabilizers of the aircraft or other adjustable components. However, although the actuation system 10 will be generally described for use on aircraft, it should be appreciated that the actuation system 10 may be used in other suitable environments and for other suitable purposes.

In a non-limiting embodiment, the actuation system 10 may generally include a motor 12, a torque limiting clutch 14, a gear box 16, and an actuator having a ball screw assembly 20 in accordance with an embodiment of the present disclosure. The motor 12 can be configured to provide rotational power to the torque limiting clutch 14, which may modulate or otherwise control a magnitude of torque that is transmitted to the gear box 16. In non-limiting embodiments, the motor 12 may be an electric motor, a hydraulic motor, or other suitable type of motor. The gear box 16 may be configured to provide mechanical advantage to the rotational power, through gearing for example, and the rotational power can be subsequently transmitted to the ball screw assembly 20 of the actuator. The ball screw assembly 20 may, in turn, be configured to convert rotational power into linear power. It should be appreciated, however, that the actuation system 10 does not require, nor is it limited to, the components described herein, but may include other components or configuration of components without departing from the scope of the present disclosure.

In an embodiment, as will be generally explained below, the ball screw assembly 20 may be configured to, among other functions, detect an amount of wear on internal components of the ball screw assembly 20 that carry load during operation. In doing so, wear on the internal components may be monitored over time to circumvent or substantially reduce the likelihood of a failure occurring in the ball screw assembly 20.

Figure 3:
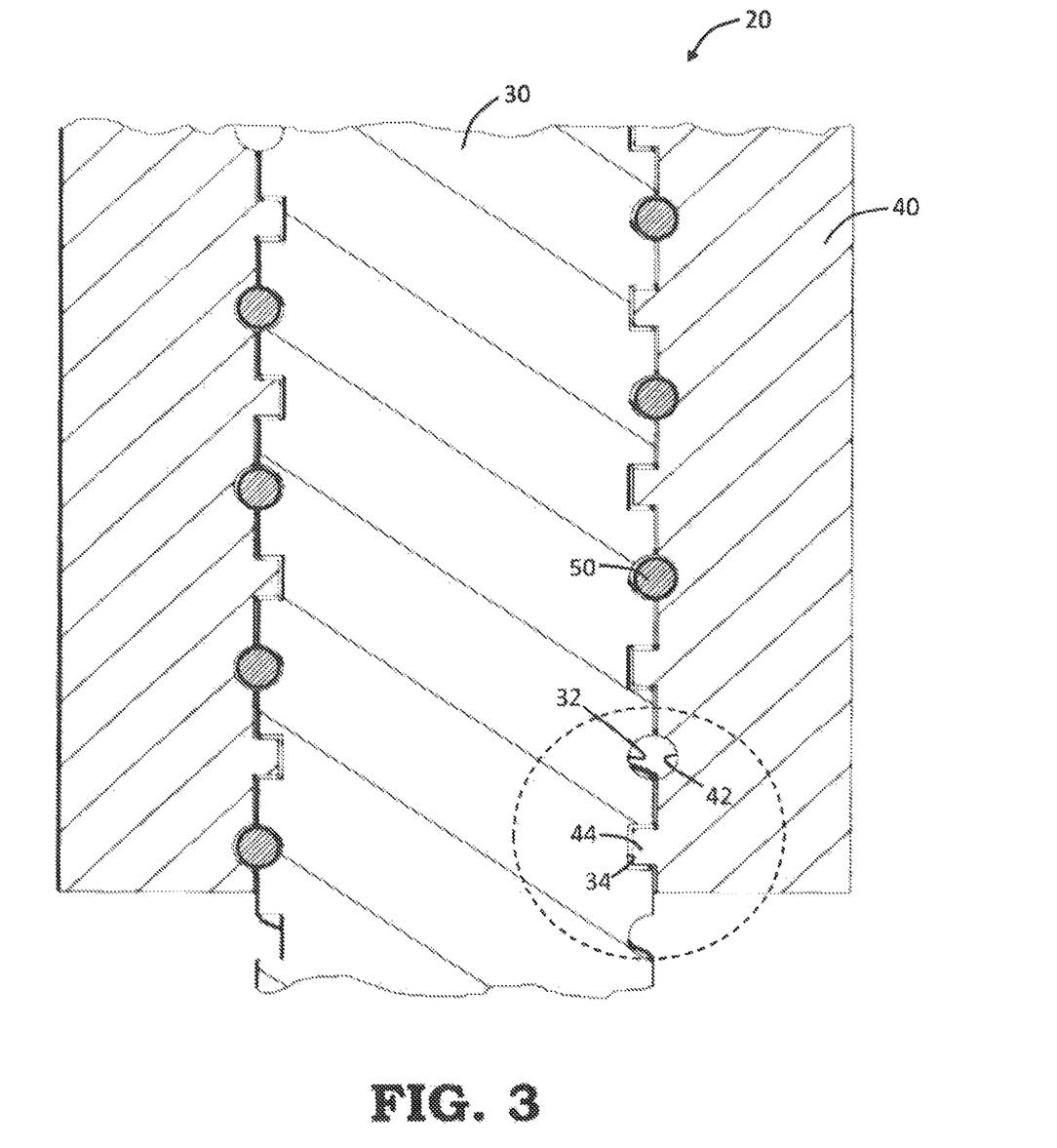
FIG. 3 is a cross-sectional side view generally showing a portion of a ball screw assembly that can be provided in the actuation system of FIG. 1 according to an embodiment of the present disclosure, wherein the ball screw assembly is generally shown in a first or normal operating mode.

As generally shown in FIG. 3, the ball screw assembly 20 may include a ball screw 30. The ball screw 30 may be supported by or otherwise provided on the actuator for rotation. In a non-limiting embodiment, the ball screw 30 may be a generally round shaft or other rotatable member and can have a longitudinal axis. The ball screw 30 may also have additional or alternative features including, but not limited to, grooves, threads, flanges, ports, or the like.

In a non-limiting embodiment, the ball screw 30 may include a first or primary groove 32. The primary groove 32 may define a helical or spiral path that can extend around an outer surface of the ball screw 30 and along a suitable length thereof. As generally shown, the primary groove 32 may have a substantially round cross-sectional shape. In a non-limiting embodiment, as will be generally explained below, the primary groove 32 may be configured to support a ball bearing or other type of suitable bearing therein to form a primary load path of the ball screw assembly 20. In other embodiments, however, the primary groove 32 may have other suitable cross-sectional shapes, such as an arcuate cross-sectional shape, a V-type cross-sectional shape, or other suitable cross-sectional shapes to, among other functions, support a ball bearing or other type of suitable bearing without departing from the scope of the present disclosure.

The ball screw 30 may also comprise a secondary groove 34. As generally shown, the secondary groove 34 may also define a helical or spiral path that can extend around an outer surface of the ball screw 30 and along a suitable length thereof. Moreover, the primary groove 32 and the secondary groove 34 may be generally intertwined with one another. The secondary groove 34 may have a substantially polygonal cross-sectional shape including, but not limited to, a trapezoidal cross-sectional shape or a square cross-sectional shape. The substantially polygonal cross-sectional shape of the secondary groove 34 may also be referred to as an acme thread. In other embodiments, however, the secondary groove 34 may have other suitable cross-sectional shapes, such as a rectangular cross-sectional shape or other non-round shapes without departing from the scope of the present disclosure.

The ball screw assembly 20 may also include a ball nut 40. In a non-limiting embodiment, the ball nut 40 can be disposed on or otherwise provided around the ball screw 30 and can be held against rotation with the ball screw 30 by the actuator. For example and without limitation, the ball nut 40 may include a longitudinal passage having an inner peripheral surface. The passage of the ball nut 40 may have an inner diameter that is slightly larger than an outer diameter of the ball screw 30, although the passage may have another suitable dimension.

The ball nut 40 may include a first or primary groove 42. The primary groove 42 may define a helical or spiral path that can extend around the inner peripheral surface of the ball nut 40 and along a suitable length thereof. As generally shown, the primary groove 42 may have a substantially round cross-sectional shape. In a non-limiting embodiment, as will be generally explained below, the primary groove 42 may be configured to support a ball bearing or other type of suitable bearing therein to form a primary load path of the ball screw assembly 20 in conjunction with the primary groove 32 of the ball screw 30. In other embodiments, however, the primary groove 42 may have other suitable cross-sectional shapes, such as an arcuate cross-sectional shape, a V-type cross-sectional shape, or other suitable cross-sectional shapes to, among other functions, support a ball bearing or other type of suitable bearing without departing from the scope of the present disclosure.

The ball nut 40 may also comprise a secondary thread 44. As generally shown, the secondary thread 44 may define a helical or spiral thread that can extend around the inner peripheral surface of the ball nut 40 and along a suitable length thereof. The primary groove 42 and the secondary thread 44 may be intertwined with one another. As generally shown, the secondary thread 44 may have a substantially polygonal cross-sectional shape including, but not limited to, a square cross-sectional shape. The substantially polygonal cross-sectional shape of the secondary thread 44 may also be referred to as an acme thread. In other embodiments, however, the secondary thread 44 may have other suitable cross-sectional shapes, such as a rectangular cross-sectional shape or other non-round shapes without departing from the scope of the present disclosure.

As generally shown in FIG. 3, when the ball nut 40 is assembled on or with the ball screw 30, the primary grooves 32 and 42 of the ball screw 30 and ball nut 40 may generally correspond with one another to form a channel. At least one bearing 50 may be disposed within the channel that is formed by the corresponding primary grooves 32 and 42, thereby forming a primary load path of the ball screw assembly 20. In a non-limiting embodiment, the bearing 50 may be a ball bearing or other type of suitable bearing member. It should be appreciated that the ball screw assembly 20 may include a suitable number of bearings 50 to, among other features, support an intended or desired load. The primary load path may have a first rate of efficiency, at least purpose of which will be generally explained below.

Referring again to FIG. 3, when the ball nut 40 is assembled on or with the ball screw 30, the secondary groove 34 of the ball screw 30 and the secondary thread 44 of the ball nut 40 may generally correspond with one another. Thus, the secondary thread 44 may be disposed within the secondary groove 34, thereby forming a secondary load path of the ball screw assembly 20. The secondary load path may have a second rate of efficiency that is less than an efficiency of the primary load path. For example and without limitation, the secondary load path may be significantly or noticeably less efficient than the primary load path.

Operation of the actuation system 10 in accordance with an embodiment of the present disclosure will now be described. In general, when the ball screw 30 is rotated relative to the ball nut 40, for example by the motor 12, the ball nut 40 can be configured to move along a length of the ball screw 30 in a substantially linear motion. The direction of travel of the ball nut 40 may depend on a rotational direction of the ball screw 30.

Figure 4:
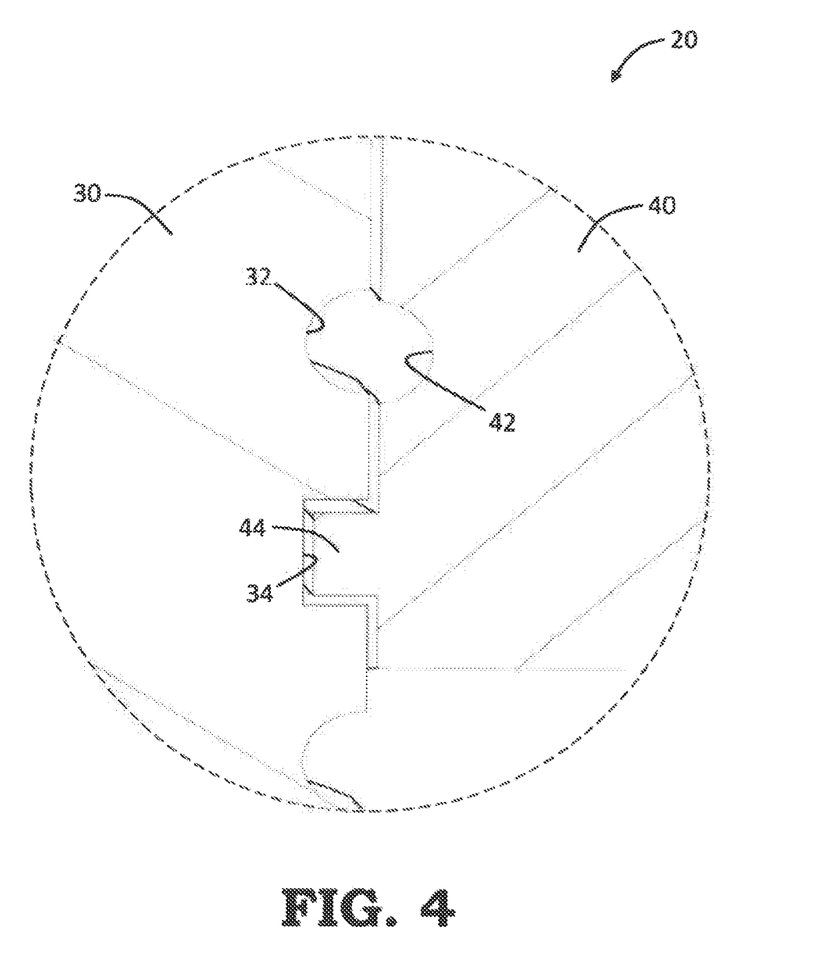
FIG. 4 is an enlarged, cross-sectional side view generally showing a portion of the ball screw assembly, as generally indicated by the broken circle in FIG. 3.

During a first or normal operating mode of the ball screw assembly 20, as generally shown in FIGS. 3 and 4, the primary load path may be engaged and the secondary load path may be disengaged. For example and without limitation, the bearing 50 that is provided in the primary load path may be configured to support or otherwise transfer substantially all of the load between the ball screw 30 and the ball nut 40. A clearance may exist between surfaces of the secondary thread 44 of the ball nut 40 and surfaces of the secondary groove 34 of the ball screw 30. In other words, the secondary load path is effectively disengaged. Since the secondary load path is disengaged, the ball screw assembly 20 can be configured to operate at a relatively higher rate of efficiency.

Figure 5:
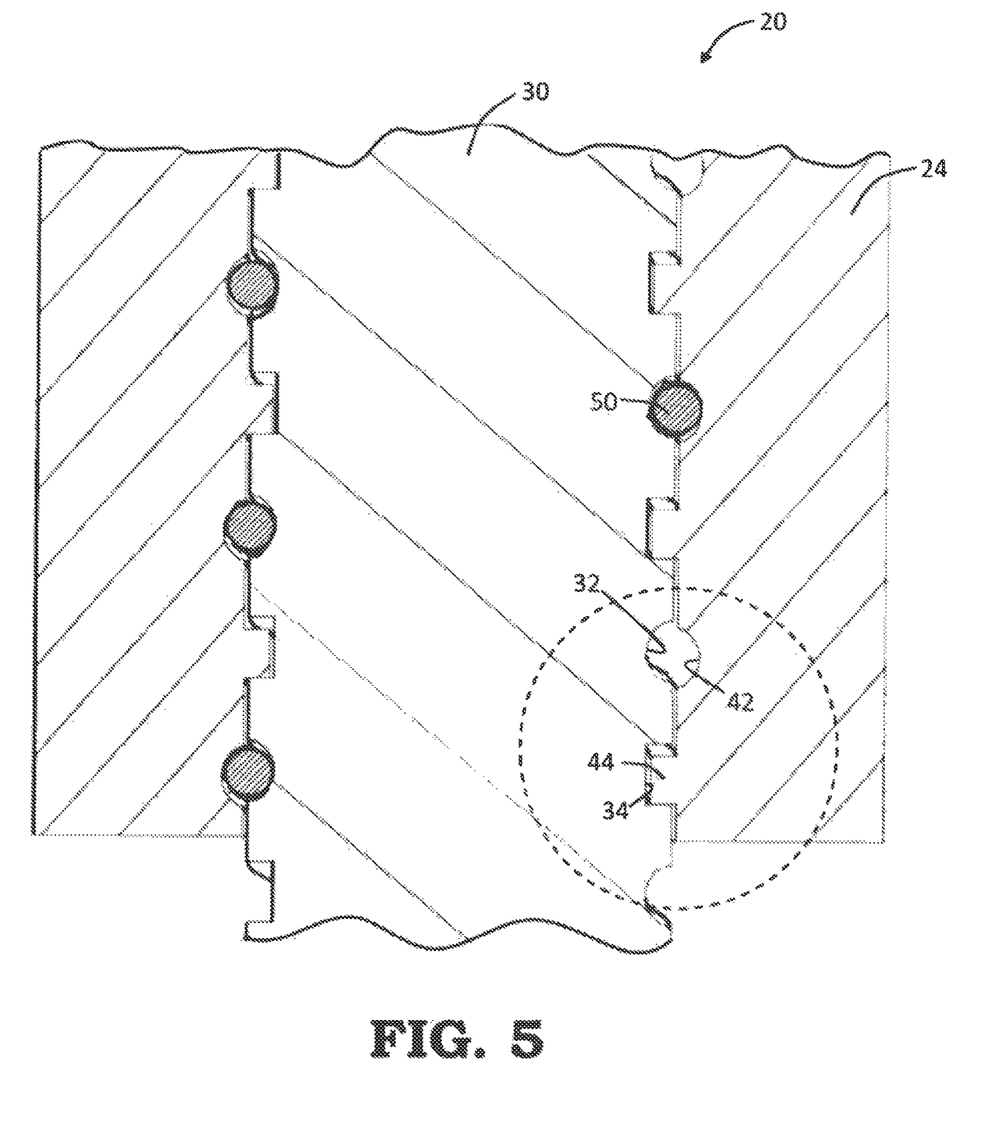
FIG. 5 is a cross-sectional side view of the portion of the ball screw assembly generally shown in FIG. 3, wherein the ball screw assembly is generally shown in a second operating mode.
Figure 6:
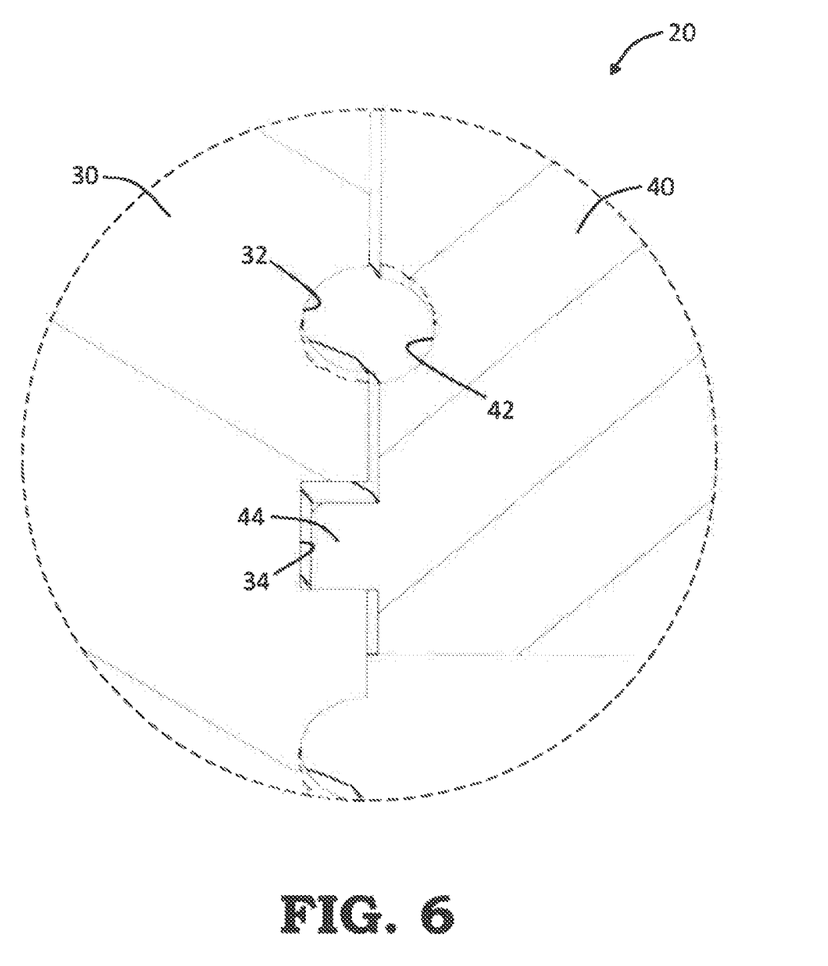
FIG. 6 is an enlarged, cross-sectional side view generally showing a portion of the ball screw assembly, as generally indicated by the broken circle in FIG. 5.

However, over a period of time, internal components of the ball screw assembly 20 may begin to wear or breakdown. For example, as generally shown in FIGS. 5 and 6, the primary groove 32 of the ball screw 30, the primary groove 42 of the ball nut 40, and the bearing 50, or any combination thereof, may begin to wear due to continued operation of the ball screw assembly 20. As these components begin to wear, endplay between the ball screw 30 and the ball nut 40 may increase. Moreover, as these components continue to wear, the endplay between the ball screw 30 and the ball nut 40 may continue to increase. When the endplay between the ball screw 30 and the ball nut 40 reaches a predetermined range or threshold, the secondary thread 44 of the ball nut 40 may begin to engage with the secondary groove 34 of the ball screw 30, or vice versa. However, as generally explained above, the efficiency rate of the secondary load path may be substantially or noticeably lower than the efficiency rate of the primary load path. Thus, when the secondary load path begins to engage as a result of increased endplay between the ball screw 30 and ball nut 40, the overall efficiency of the ball screw assembly 20 begins to drop. This reduction in efficiency may be directly proportional or otherwise related to the amount of wear on the internal components of the ball screw assembly 20.

In a non-limiting embodiment, an efficiency of the ball screw assembly 20 can be measured or otherwise detected in a variety of ways to monitor wear on the internal components thereof. It should be appreciated that such methods for detecting an efficiency of the ball screw assembly 20 may be mechanical or electrical. For example and without limitation, an efficiency of the ball screw assembly 20 may be detected at the motor 12 via reduced speed or increased current. In another example, an output of the torque limiting clutch 14 may be detected for stopping time, or by a detent that may stop output speed. Other suitable methods of detecting an efficiency of the ball screw assembly 20 are also contemplated and within the scope of the present disclosure.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. An actuation system comprising:
a motor;
a gear box operatively coupled to the motor;
a torque-limiting clutch receiving power from the motor and modulating a magnitude of torque transmitted to the gear box;
an actuator operatively coupled to the gear box, the actuator having a ball screw assembly comprising:
a ball screw supported for rotation by the actuator;
a ball nut provided around the ball screw and held against rotation with the ball screw by the actuator;
a primary load path provided between the ball screw and the ball nut for operatively coupling the ball nut with the ball screw; and
a secondary load path provided between the ball screw and the ball nut, wherein the secondary load path is disengaged during a first operating mode of the ball screw assembly and the secondary load path is engaged during a second operating mode of the ball screw assembly;
wherein the ball screw has a primary groove and a secondary groove extending around an outer surface thereof, the primary groove and the secondary groove each extending inwardly from the outer surface, and the ball nut has a primary groove and a secondary thread extending around an inner peripheral surface thereof, the secondary thread extending outwardly from the inner peripheral surface; the primary grooves of the ball screw and ball nut generally correspond with one another as part of the primary load path, and the secondary groove of the ball screw and the secondary thread of the ball nut generally correspond with one another to form the secondary load path; the second operating mode is initiated when endplay between the ball screw and the ball nut formed from deformation of at least one of the primary grooves exceeds a predetermined range or threshold, and does not return to the first operating mode; and a change from the first operating mode to the second operating mode is detected at the motor via reduced speed or increased current and/or by an output of the torque limiting clutch being detected for stopping time.

2. The actuation system of claim 1, wherein the primary groove and the secondary groove of the ball screw each forms a helical path extending around the outer surface of the ball screw.

3. The actuation system of claim 2, wherein the primary groove of the ball screw has a substantially round cross-sectional shape and the secondary groove of the ball screw has a substantially polygonal cross-sectional shape.

4. The actuation system of claim 1, wherein the primary groove and the secondary thread of the ball nut each forms a helical path extending around the inner peripheral surface.

5. The actuation system of claim 4, wherein the primary groove of the ball nut has a substantially round cross-sectional shape and the secondary thread of the ball nut has a substantially polygonal cross-sectional shape.

6. The actuation system of claim 1, wherein the primary load path has a first efficiency and the secondary load path has a second efficiency that is lower than the primary load path.

7. The actuation system of claim 1, wherein the secondary groove and the secondary thread form an acme thread screw.

8. The actuation system of claim 1, wherein a clearance exists between all surfaces of the secondary groove and all surfaces of the secondary thread in the first operating mode.

9. The actuation system of claim 1, further including at least one bearing disposed within the corresponding primary grooves of the ball screw and ball nut to form the primary load path, and the secondary thread of the ball nut is disposed within the secondary groove of the ball screw to form the secondary load path.

\* \* \* \* \*